C. NEUMANN.
BLOWER.
APPLICATION FILED FEB. 24, 1913.

1,086,686.

Patented Feb. 10, 1914.

Witnesses
W. C. Stein
M. G. Lindsay.

Inventor
Christian Neumann
by Alfred A. Eicks Atty.

UNITED STATES PATENT OFFICE.

CHRISTIAN NEUMANN, OF ST. LOUIS, MISSOURI.

BLOWER.

1,086,686.  Specification of Letters Patent.  Patented Feb. 10, 1914.

Application filed February 24, 1913. Serial No. 750,241.

*To all whom it may concern:*

Be it known that I, CHRISTIAN NEUMANN, a citizen of the United States, and resident of St. Louis, Missouri, have invented certain new and useful Improvements in Blowers, of which the following is a specification.

This invention relates to improvements in revolving members for blowers and has for its object to provide a revolving member whose outlet is smaller than the inlet thereby causing the air to be discharged at a relatively high rate of speed.

A further object of my invention is to provide a revolving member for blowers so constructed as to practically eliminate the whirling movement of the air during the time it is confined between the blades thereof.

A further object is to provide a revolving member for blowers so constructed as to reduce the back pressure of the air which has been discharged into the housing to a minimum.

Figure 1:
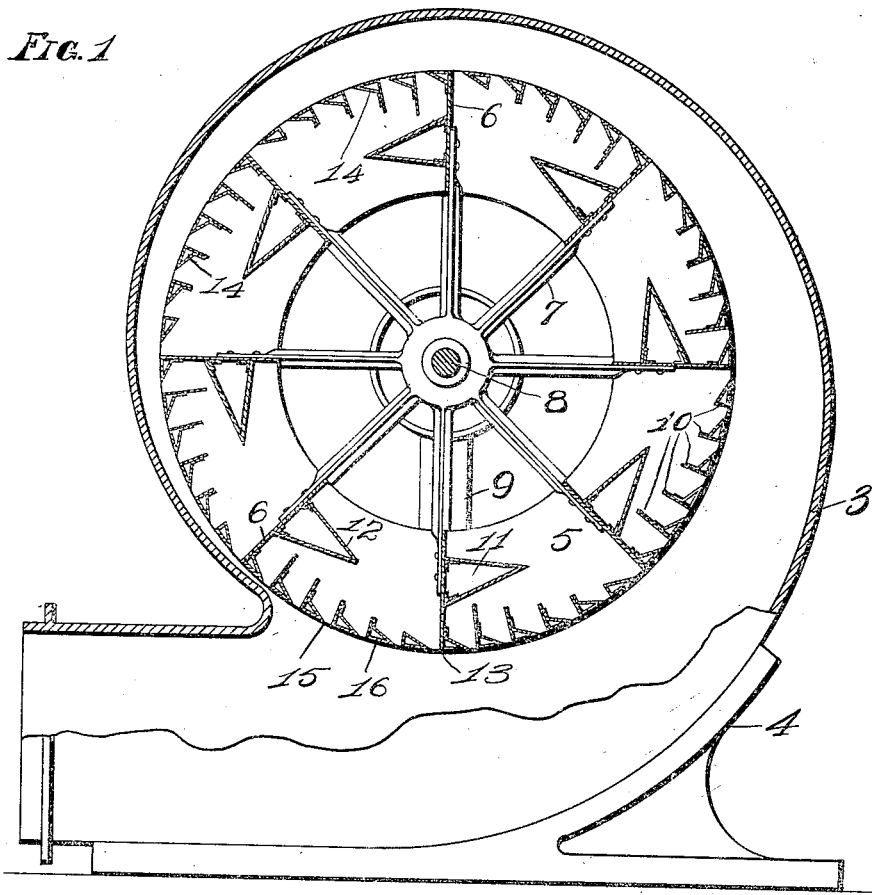
Figure 2:
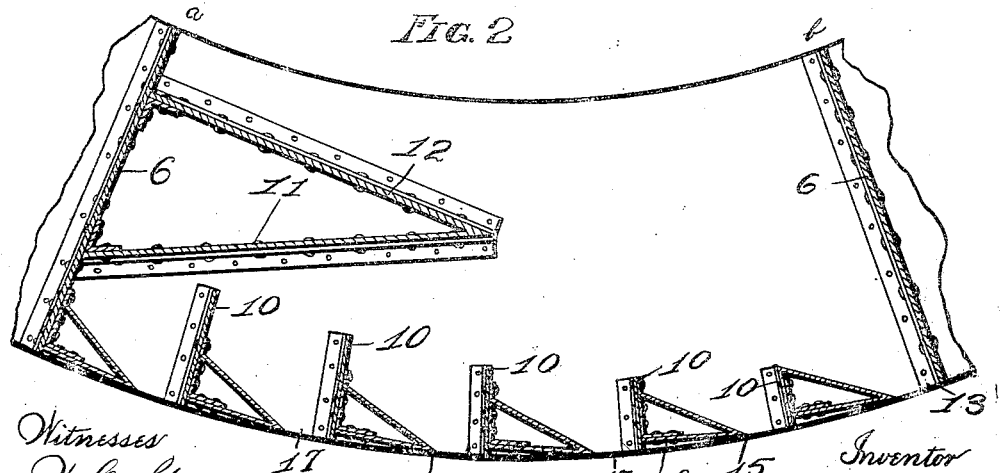

Figure 1 is a central sectional view of my invention. Fig. 2 is an enlarged detail section view illustrating one section or one compartment of the rotating member showing the construction and position of the main and auxiliary paddles.

As illustrated in the drawings 3 indicates a housing of the ordinary blower type and mounted upon a base 4. In this housing is located my improved rotary member which consists of two rings 5, main paddles 6 and a spider 7 all rotatably mounted and supported on a shaft 8: the main paddles are firmly attached to the arms of the spider, which in reality would be the spokes of the device, and the shaft 8 supporting the rotating member is mounted in journals of the usual type supported on standards 9 located at each side of the housing. The several main paddles, the ends of which are firmly secured to the rings 5 divide the rotating member into a plurality of compartments, and in each of these compartments are located a plurality of auxiliary paddles 10, each successively increasing in radial breadth.

On the rear face of each of the main paddles is firmly secured a tapered deflector 11, the upper portion 12 of the deflectors being arranged at an angle in a direct line with the outer edge 13 of the following main paddle so that the air while passing through each compartment during the rapid rotation of the rotary member will deflect the air contacting with the deflector in a straight line and permit the same to freely pass through the discharge space immediately in advance of the following main paddle. Each of the auxiliary paddles 10 is likewise provided with a tapered deflector 14, the apex 15 of each being even with the periphery of the rotating member while the base 16 is raised a certain degree so as to prevent the air from adhering to the bottom portion of the deflectors.

The space of each compartment extending from *a* to *b*, as shown in Fig. 2 is of a length slightly larger than the combined discharge spaces 17 through which the air is discharged by centrifugal force, and by means of the fact that the discharge end is somewhat smaller than the inlet, will cause the air to pass out under pressure, and by means of each deflector the air is permitted to escape on direct lines without forming a suction or whirlwind within each of the compartments. By the radial increase of length of each successive auxiliary paddle the space of each compartment is so divided as to create a direct and straight discharge of the air and obviates the carrying of dead air following each main paddle as is the present occurrence in the ordinary blowers. Each of these auxiliary paddles extends the entire width from ring to ring and is firmly riveted to said rings so as to make the construction rigid and durable.

This invention is an improvement over an application for patent filed by the applicant August 16, 1912, Serial No. 715,504 and which application is now pending in Division No. 9.

Having fully described my invention, what I claim is:

1. Revolving members for blowers comprising a pair of rings, a spider, paddles connected to the spider and firmly secured to both of said rings, a plurality of auxiliary paddles located between the paddles extending from ring to ring and increasing in radial breadth, and tapered deflectors mounted on the paddles and the auxiliary paddles, substantially as specified.

2. A device of the class described comprising a rotating member consisting of a spider, a pair of rings, paddles secured to the ends of the members forming the spider, and firmly secured to said rings dividing the rotating member into separate compartments, a tapered deflector rigidly attached to one side of each of the paddles, and extending approximately to the center of the compartment, a plurality of auxiliary paddles located in each compartment, extending from ring to ring and firmly secured thereto, and tapered deflectors secured to one side of each of said auxiliary paddles, substantially as specified.

3. A device of the class described comprising a rotating member consisting of a spider, paddles secured thereto, rings located on each side of the spider and firmly secured to the paddles, a tapered deflector secured to one side of each paddle and extending approximately to the center of the compartment, a plurality of auxiliary paddles located in each compartment and positioned at the periphery of the rotating member, the radial breadth of each paddle increasing, the highest paddle being nearest to the base of the main paddle, and tapered deflectors carried by each of said paddles, substantially as specified.

In testimony whereof, I have signed my name to this specification, in presence of two subscribing witnesses.

CHRISTIAN NEUMANN.

Witnesses:
ALFRED A. EICKS,
WALTER C. STEIN.